US008330069B2

(12) United States Patent
Cutler et al.

(10) Patent No.: US 8,330,069 B2
(45) Date of Patent: Dec. 11, 2012

(54) APPARATUS AND SYSTEM FOR ARC ELMINATION AND METHOD OF ASSEMBLY

(75) Inventors: Seth Adam Cutler, Middletown, CT (US); Dean Arthur Robarge, Southington, CT (US); George William Roscoe, Farmington, CT (US)

(73) Assignee: General Electric Company, Schenectady, NY (US)

(*) Notice: Subject to any disclaimer, the term of this patent is extended or adjusted under 35 U.S.C. 154(b) by 169 days.

(21) Appl. No.: 12/883,329

(22) Filed: Sep. 16, 2010

(65) Prior Publication Data

US 2012/0067854 A1 Mar. 22, 2012

(51) Int. Cl.
*B23K 9/00* (2006.01)

(52) U.S. Cl. ................................ 219/121.48; 219/121.5

(58) Field of Classification Search ............. 219/121.36, 219/121.43, 121.48–121.59; 361/2, 230, 361/233, 253

See application file for complete search history.

(56) References Cited

U.S. PATENT DOCUMENTS

| | | | | |
|---|---|---|---|---|
| 4,521,666 | A | 6/1985 | Severance, Jr. et al. | |
| 4,959,520 | A | 9/1990 | Okada et al. | |
| 5,124,525 | A | 6/1992 | Severance, Jr. et al. | |
| 5,157,240 | A * | 10/1992 | Chow | 219/444.1 |
| 5,308,949 | A | 5/1994 | Reed, Jr. et al. | |
| 5,317,126 | A | 5/1994 | Couch, Jr. et al. | |
| 6,040,548 | A | 3/2000 | Siniaguine | |
| 6,096,992 | A | 8/2000 | Severance, Jr. | |
| 6,121,571 | A | 9/2000 | Siniaguine et al. | |
| 6,278,241 | B1 | 8/2001 | Enguelcht et al. | |
| 7,281,478 | B2 | 10/2007 | Wang et al. | |
| 2008/0239598 | A1 * | 10/2008 | Asokan et al. | 361/56 |
| 2009/0134129 | A1 * | 5/2009 | Robarge et al. | 219/121.48 |

* cited by examiner

*Primary Examiner* — Sang Paik
(74) *Attorney, Agent, or Firm* — Global Patent Operation

(57) ABSTRACT

An ablative plasma gun includes a first portion having a first diameter and a second portion having a second diameter that is larger than the first diameter, wherein a chamber is defined by the first portion and the second portion.

20 Claims, 4 Drawing Sheets

APPARATUS AND SYSTEM FOR ARC ELMINATION AND METHOD OF ASSEMBLY

BACKGROUND OF THE INVENTION

The embodiments described herein relate generally to plasma guns and, more particularly, to ablative plasma guns for use in eliminating arc flashes.

Electric arc devices may be used in a variety of applications including, for example, series capacitor protection, high power switches, acoustic generators, shock wave generators, pulsed plasma thrusters, and arc mitigation devices. Such known devices generally include two or more main electrodes separated by a gap of air. A bias voltage is then applied to the main electrodes across the gap. However, at least some known electric arc devices require the main electrodes to be positioned closely together. Contaminants, or even the natural impedance of the air in the gap, can lead to arc formation between the main electrodes at undesirable times, which can lead to a circuit breaker being tripped when it would be otherwise unnecessary.

Accordingly, at least some known electric arc devices simply position the main electrodes further apart to avoid such false positive results. However, these devices are typically less reliable because of a less effective spread of plasma from a plasma gun. For example, at least some known plasma guns provide a plasma spread that does not effectively promote effective dielectric breakdown and reduction of impedance in the gap of air between the main electrodes. Such plasma guns can therefore show a lower level of reliability.

BRIEF DESCRIPTION OF THE INVENTION

In one aspect, an ablative plasma gun includes a first portion having a first diameter and a second portion having a second diameter that is larger than the first diameter, wherein a chamber is defined by the first portion and the second portion.

In another aspect, an arc flash elimination system includes a plurality of main electrodes, wherein each of the plurality of main electrodes is coupled to a different portion of an electrical circuit. The arc flash elimination system also includes an ablative plasma gun positioned with respect to the plurality of main electrodes. The ablative plasma gun includes a first portion having a first diameter and a second portion having a second diameter that is larger than the first diameter, wherein a chamber is defined by the first portion and the second portion.

In another aspect, a method of assembling an arc flash elimination system includes coupling each of a plurality of main electrodes to a different portion of an electrical circuit, and positioning an ablative plasma gun with respect to the plurality of main electrodes. The ablative plasma gun includes a first portion having a first diameter and a second portion positioned above the first portion and having a second diameter that is larger than the first diameter, wherein a chamber defined by the first portion and the second portion.

DETAILED DESCRIPTION OF THE INVENTION

Exemplary embodiments of systems, methods, and apparatus for use in arc flash elimination by initiation of an isolated arc within a self-contained device are described herein. These embodiments provide an ablative plasma gun that includes a chamber having a first portion, or lower portion, having a first diameter, and a second portion, or upper portion, having a second diameter that is larger than the first diameter. This plasma gun design facilitates an increased reliability and enhances plasma breakdown and arc creation between main electrodes of an arc elimination system. For example, the embodiments described herein provide a greater plasma spread after the arc is created between the main electrodes, which facilitates enhanced dielectric breakdown within a main gap between the main electrodes. The additional plasma spread and dielectric breakdown enable the arc elimination system to perform under a wider range of bias voltages between the main electrodes, including bias voltages as low as 200 volts, and at a wider range of impedances within the main gap.

Figure 1:
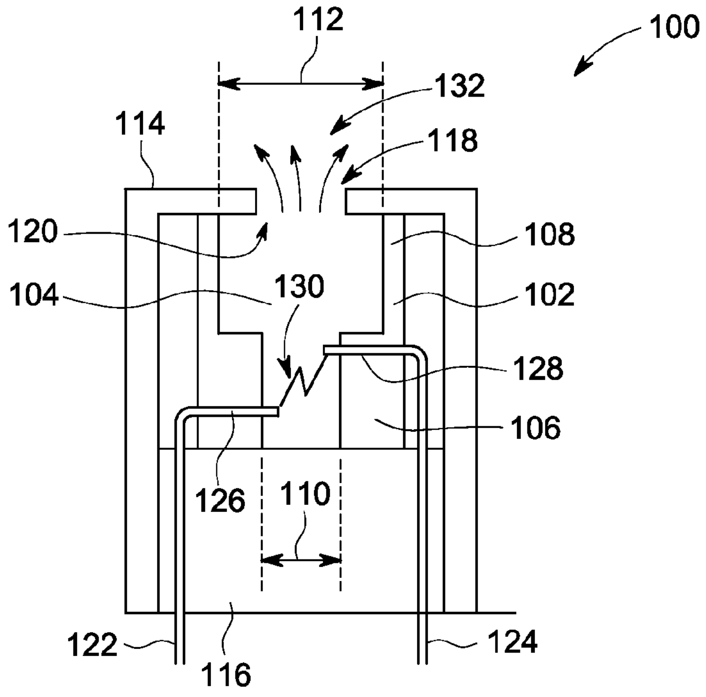
FIG. 1 is a sectional view of an exemplary ablative plasma gun.

FIG. 1 is a sectional view of an exemplary ablative plasma gun 100 that includes a cup 102 having a chamber 104 formed therein. Cup 102 includes a first portion 106 and a second portion 108 that is positioned with respect to first portion 106 to define chamber 104. For example, in the exemplary embodiment, second portion 108 is positioned above first portion 106. Moreover, first portion 106 has a first diameter 110. In the exemplary embodiment, first diameter 110 is approximately 0.138 inches. In addition, second portion 108 has a second diameter 112 that is larger than first diameter 110. In the exemplary embodiment, second diameter 112 is approximately 0.221 inches. It should be noted that any suitable measurements may be used for first diameter 110 and/or second diameter 112 that enable plasma gun 100 to function as described herein. Moreover, in the exemplary embodiment, first portion 106 and second portion 108 are integrally formed and chamber 104 is defined therein. In an alternative embodiment, first portion 106 and second portion 108 are separately formed and are coupled together to form chamber 104. In the exemplary embodiment, cup 102 is formed from an ablative material such as Polytetrafluoroethylene, Polyoxymethylene Polyamide, Poly-methyle methacralate (PMMA), other ablative polymers, or various mixtures of these materials.

Moreover, plasma gun 100 includes a cover 114 and a base 116. In the exemplary embodiment, cover 114 is mounted on base 116 and is sized to enclose cup 102. Specifically, cup 102 is positioned between base 116 and cover 114. In addition, a nozzle 118 is formed within cover 114. Nozzle 118 is positioned above an open end 120 of cup 102. In the exemplary embodiment, cover 114 and/or base 116 are formed from the same ablative material as cup 102. Alternatively, cover 114 and/or base 116 are formed from one or more different ablative materials than cup 102, such as a refractory material or a ceramic material.

Furthermore, in the exemplary embodiment, plasma gun 100 includes a plurality of gun electrodes, including a first gun electrode 122 and a second gun electrode 124. First gun electrode 122 includes a first end 126 and second gun electrode 124 includes a second end 128 that each extend into chamber 104. For example, first end 126 and second end 128 enter chamber 104 from radially opposite sides of chamber 104 about a central axis (not shown) of chamber 104. Moreover, first end 126 and second end 128 are diagonally opposed across chamber 104, to define a gap for formation of an arc 130. Electrodes 122 and 124, or at least first end 126 and second end 128, may be formed from, for example, tungsten steel, tungsten, other high temperature refractory metals or alloys, carbon or graphite, or any other suitable materials that enable formation of arc 130. A pulse of electrical potential that is applied between electrodes 122 and 124 creates arc 130 that heats and ablates a portion of the ablative material of cup 102 to create a highly conductive plasma 132 at high pressure. Plasma 132 exits nozzle 118 in a spreading pattern at supersonic speed. Characteristics of plasma 132, such as velocity, ion concentration, and an area of spread, may be controlled by dimensions of electrodes 122 and 124 and/or by a separation distance between first end 126 and second end 128. These characteristics of plasma 132 may also be controlled by the interior dimensions of chamber 104, the type of ablative material used to form cup 102, a trigger pulse shape, and/or a shape of nozzle 118.

Figure 2:
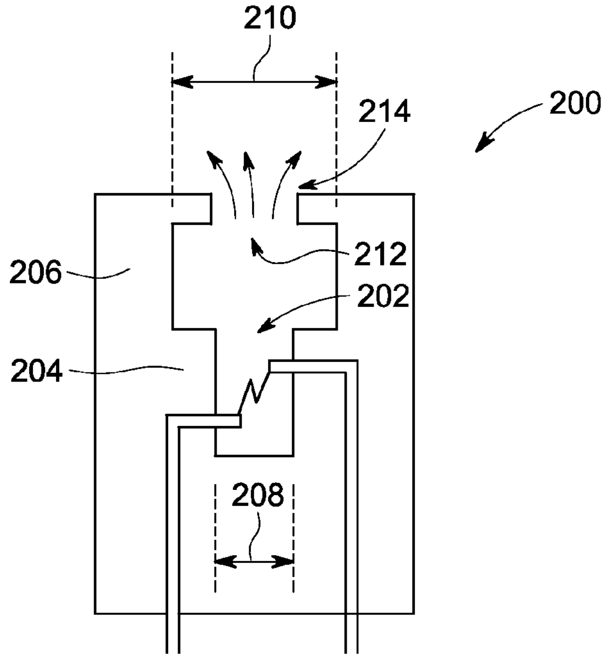
FIG. 2 is a sectional view of an alternative embodiment of an ablative plasma gun.

FIG. 2 is a sectional view of an alternative embodiment of an ablative plasma gun 200. As shown in FIG. 2, plasma gun 200 is integrally formed from a single ablative material. Plasma gun 200 includes a chamber 202 that is defined by a first portion 204 and a second portion 206, which is positioned above first portion 204 and is integrally formed with first portion 204. Moreover, first portion 204 has a first diameter 208 and second portion 206 has a second diameter 210. In the exemplary embodiment of FIG. 2, second diameter 210 is larger than first diameter 208. Moreover, as shown in FIG. 2, chamber 202 includes an open end 212 that partially extends across second portion 206 to form a nozzle 214.

Figure 3:
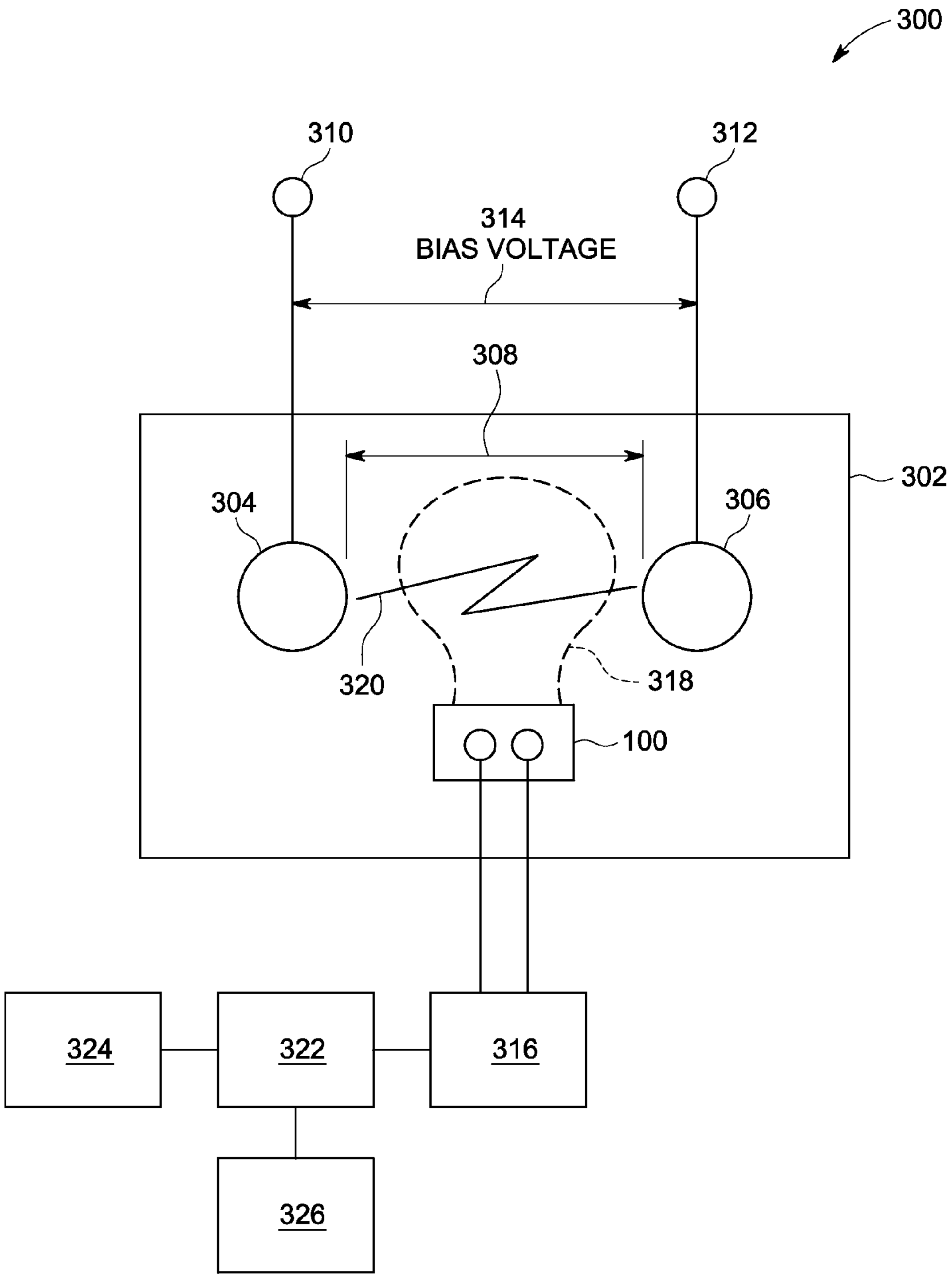
FIG. 3 is a simplified circuit diagram of an exemplary arc elimination system that includes the ablative plasma gun shown in FIG. 1 or FIG. 2.

FIG. 3 is a simplified circuit diagram of an exemplary arc detection and elimination system 300 that includes an ablative plasma gun, such as plasma gun 100 of FIG. 1. However, it should be understood that plasma gun 200 of FIG. 2 may also be used with system 300. In the exemplary embodiment, system 300 also includes a main arc device 302, such as an arc containment device, that includes a plurality of main electrodes, such as two or more main electrodes 304 and 306 separated by a main gap 308 of air or another gas. For example, main electrodes 304 and 306 are positioned approximately 0.275 inches apart due to second diameter 112 (shown in FIG. 1). This distance between main electrodes 304 and 306 enhances the response of arc elimination system 300 at low voltage. Each main electrode 304 and 306 is coupled to an electrically different portion 310 and 312, respectively, of a power circuit, such as different phases, neutral, or ground. Coupling main electrodes 304 and 306 to power circuit portions 310 and 312 provides a bias voltage 314 across main gap 308. In the exemplary embodiment, bias voltage 314 is between approximately 650 volts and approximately 815 volts. System 300 also includes a trigger circuit 316 that activates plasma gun 100 by transmitting an electrical pulse to plasma gun 100.

Moreover, system 300 includes a logic circuit 322, such as a relay or processor. It should be understood that the terms "logic circuit" and "processor" refer generally to any programmable system including systems and microcontrollers, reduced instruction set circuits (RISC), application specific integrated circuits (ASIC), programmable logic circuits, and any other circuit or processor capable of executing the functions described herein. The above examples are exemplary only, and thus are not intended to limit in any way the definition and/or meaning of these terms. In the exemplary embodiment logic circuit 322 is communicatively coupled to one or more sensors 324, which may include light sensors, sound sensors, current sensors, voltage sensors, or any combination of these. Furthermore, system 300 includes one or more circuit breakers 326 that are communicatively coupled to logic circuit 322.

During operation, sensors 324 detect an event that is indicative of an arc flash is on the power circuit. For example, a current sensor can detect a rapid increase in current through a conductor of the power circuit, a voltage sensor can detect a rapid decrease in voltage across multiple conductors of the power circuit, or a light sensor can detect a light flash. In some embodiments, sensors 324 include a combination of current sensors, voltage sensors, and/or light sensors, such that multiple events may be detected within a specified time period to indicate the occurrence of an arc flash. In the exemplary embodiment, sensors 324 transmit a signal representative of the detection to logic circuit 322. In some embodiments, logic circuit 322 analyses the detection to determine whether the event is indicative of an arc flash or some other event, such as a trip of circuit breaker 326. When logic circuit 322 determines that the event is indicative of an arc flash, logic circuit 322 transmits an activation signal to trigger circuit 316. Main arc device 302 is then triggered by a voltage or current pulse to plasma gun 100 from trigger circuit 316. In response to the voltage or current pulse, plasma gun 100 injects ablative plasma 318 into main gap 308, which reduces the impedance of main gap 308 sufficiently to enable initiation of a protective arc 320 between main electrodes 304 and 306. Arc 320 absorbs energy from the arc flash and opens circuit breaker 326, which quickly stops the arc flash and protects the power circuit. As used herein, the term "main" refers generally to elements of a larger arc-based device to differentiate these elements from elements of plasma gun 100.

Figure 4:
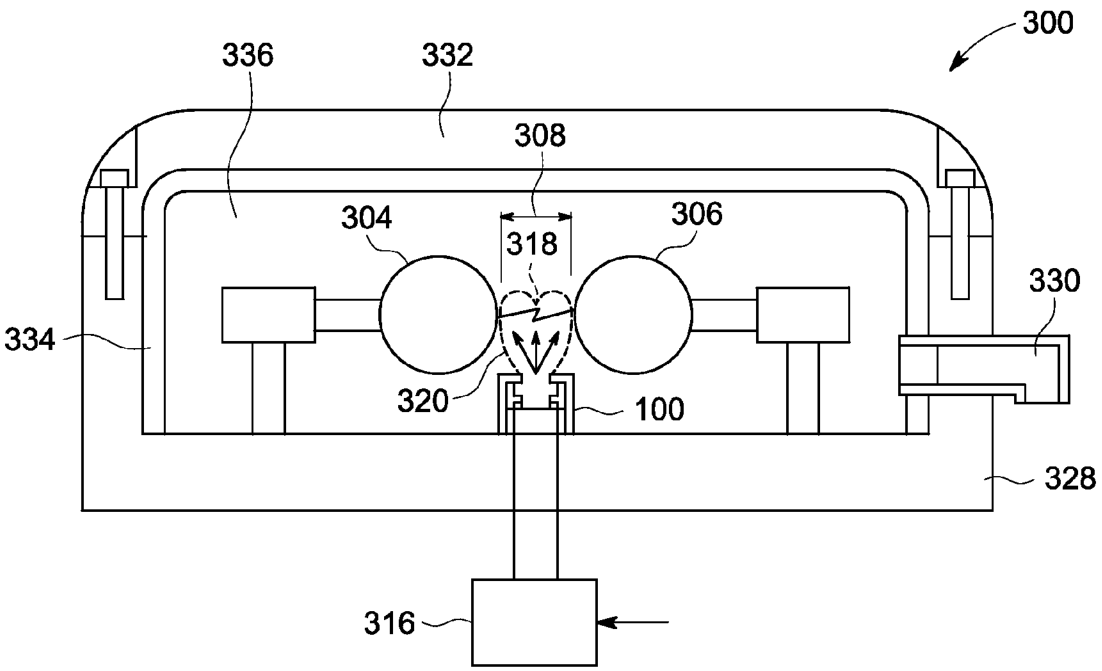
FIG. 4 is a sectional view of the arc elimination system shown in FIG. 3.
Figure 5:
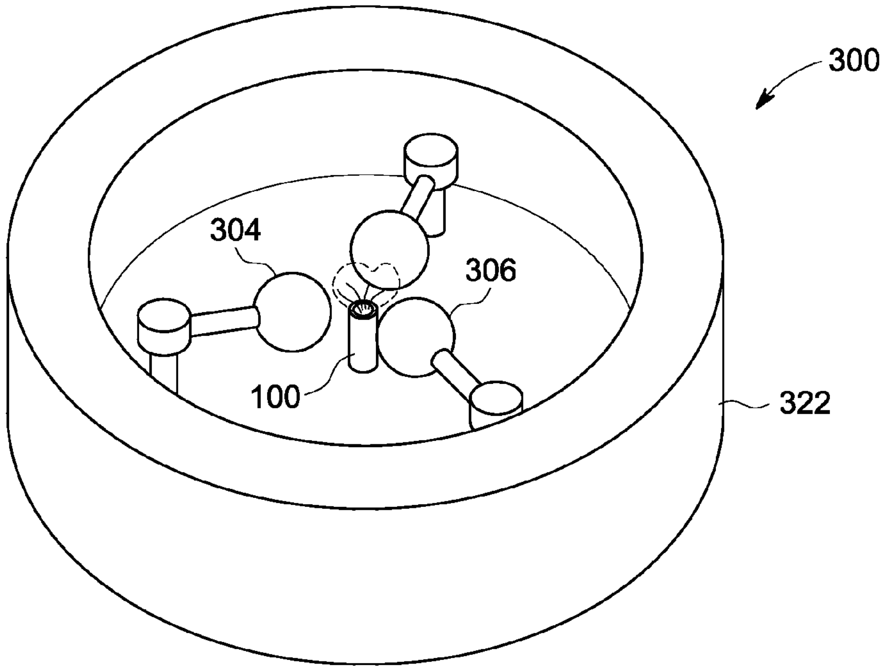
FIG. 5 is a perspective view of the arc elimination system shown in FIG. 3.

FIG. 4 is a sectional view of arc elimination system 300, and FIG. 5 is a perspective view of arc elimination system 300. In the exemplary embodiment, main arc device 302 and ablative plasma gun 100 are located in a pressure-tolerant case 328. In some embodiments, case 328 includes one or more vents 330 for controlled pressure release. Moreover, case 328 includes an outer cover 332 and an isolation container or shock shield 334 that defines an interior chamber 336 that safely contains the energy created by arc 320.

Figure 6:
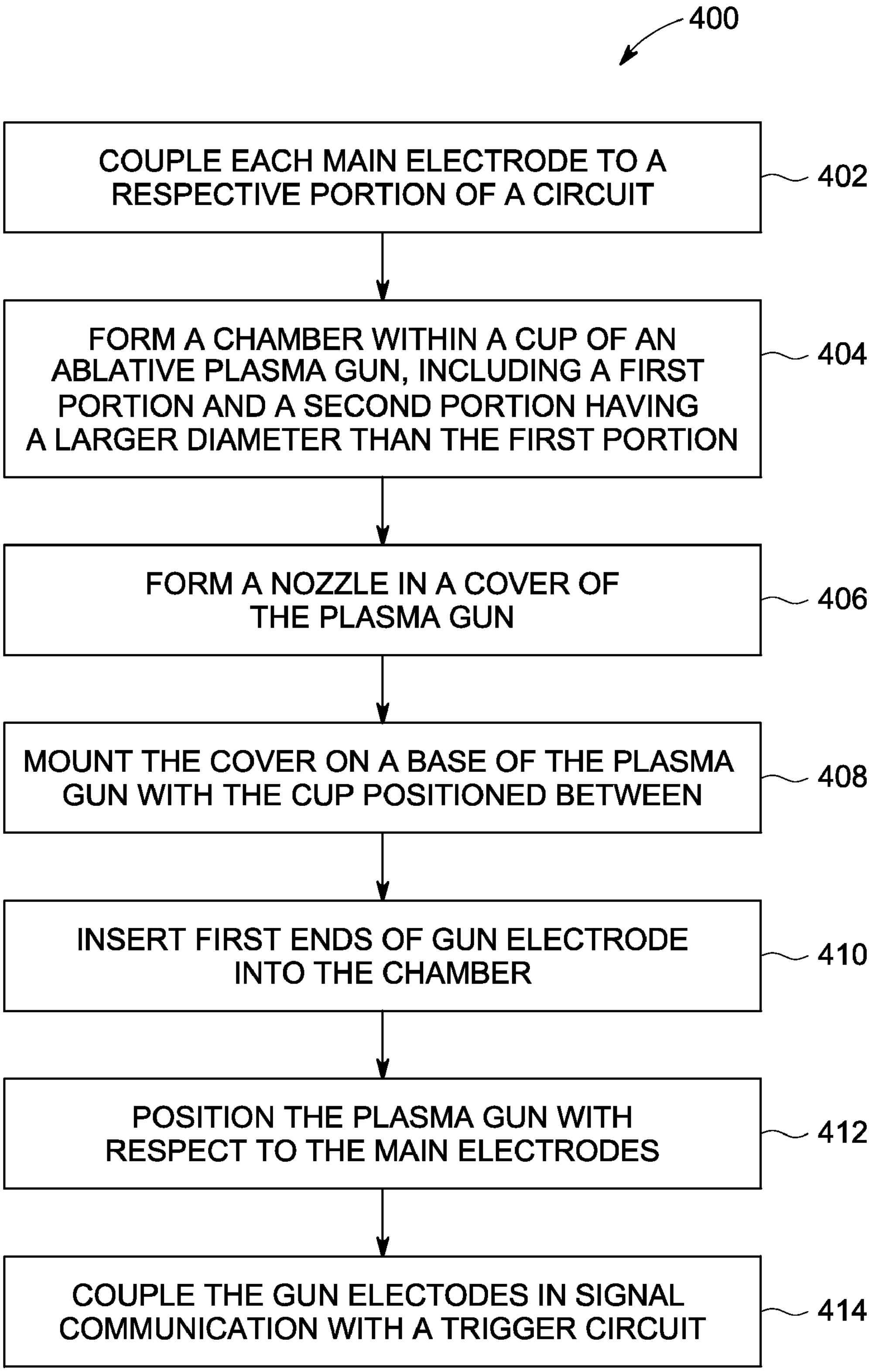
FIG. 6 is a flowchart that illustrates an exemplary method of assembling the arc elimination system shown in FIGS. 3-5.

FIG. 6 is a flowchart 400 that illustrates an exemplary method of assembling system 300 (shown in FIGS. 3-5). In the exemplary embodiment, each main electrode 304 and 306 (shown in FIGS. 3-5) is coupled 402 to a different portion 310 and 312 (shown in FIGS. 3 and 4) of an electrical circuit, such as a power circuit. The position of each main electrode 304 and 306 creates main gap 308 (shown in FIGS. 3 and 4) that is filled with air or another gas. Moreover, chamber 104 of ablative plasma gun 100 is formed 404 within cup 102 and nozzle 118 is formed 406 in cover 114 (each element shown in FIG. 1). Cover 114 is then mounted 408 on base 116 (shown in FIG. 1) such that cup 102 is positioned between base 116 and cover 114. Alternatively, and referring to FIG. 2, plasma gun 200 is integrally formed from a single ablative material. In such an embodiment, chamber 202 is formed from the ablative material, including first portion 204 and second portion 206.

Referring again to FIG. 6, and in the exemplary embodiment, first end 126 and second end 128 (both shown in FIG. 1) of gun electrodes 122 and 124 (shown in FIG. 1), respectively, are inserted 410 into chamber 104 such that first end 126 and second end 128 extend in radially opposite directions form a central axis of chamber 104. Ablative plasma gun 100 or, alternatively, ablative plasma gun 200 is then positioned 412 with respect to main electrodes 304 and 306. In addition, gun electrodes 122 and 124 are coupled 414 in signal communication to trigger circuit 316 (shown in FIGS. 3 and 4).

Exemplary embodiments of systems, methods, and apparatus for use in arc flash elimination are described above in detail. The systems, methods, and apparatus are not limited to the specific embodiments described herein but, rather, operations of the methods and/or components of the system and/or apparatus may be utilized independently and separately from other operations and/or components described herein. Further, the described operations and/or components may also be defined in, or used in combination with, other systems, methods, and/or apparatus, and are not limited to practice with only the systems, methods, and storage media as described herein.

Although the present invention is described in connection with an exemplary power circuit environment, embodiments of the invention are operational with numerous other general purpose or special purpose electrical circuit environments or configurations. The power circuit environment is not intended to suggest any limitation as to the scope of use or functionality of any aspect of the invention. Moreover, the power circuit environment should not be interpreted as having any dependency or requirement relating to any one or combination of components illustrated in the exemplary operating environment.

The order of execution or performance of the operations in the embodiments of the invention illustrated and described herein is not essential, unless otherwise specified. That is, the operations may be performed in any order, unless otherwise specified, and embodiments of the invention may include additional or fewer operations than those disclosed herein. For example, it is contemplated that executing or performing a particular operation before, contemporaneously with, or after another operation is within the scope of aspects of the invention.

When introducing elements of aspects of the invention or embodiments thereof, the articles "a," "an," "the," and "said" are intended to mean that there are one or more of the elements. The terms "comprising," "including," and "having" are intended to be inclusive and mean that there may be additional elements other than the listed elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. An ablative plasma gun comprising a cup formed from an ablative material, the cup comprising:
- a first portion having a first diameter; and
- a second portion having a second diameter that is larger than the first diameter, wherein a chamber is defined within the cup by the first portion and the second portion.

2. An ablative plasma gun in accordance with claim 1, wherein the second portion is positioned above the first portion.

3. An ablative plasma gun in accordance with claim 1, wherein the first portion and the second portion are integrally formed.

4. An ablative plasma gun in accordance with claim 1, further comprising a first gun electrode comprising a first end, and a second gun electrode comprising a second end, wherein the first end and the second end extend in opposite directions from a central axis of the chamber.

5. An ablative plasma gun in accordance with claim 4, wherein the first end of the first gun electrode and the second end of the second gun electrode enter the chamber on radially opposite sides of the chamber.

6. An ablative plasma gun in accordance with claim 1, wherein the chamber further comprises an open end extending partially across the second diameter such that the open end defines a nozzle.

7. An ablative plasma gun in accordance with claim 1, wherein the cup includes an open end, said ablative plasma gun further comprising a cover that is sized to enclose the cup, wherein the cover comprises a nozzle.

8. An ablative plasma gun in accordance with claim 7, further comprising a base, wherein the cover is mounted on the base and the cup is positioned between the base and the cover.

9. An arc flash elimination system comprising:
- a plurality of main electrodes, wherein each of the plurality of main electrodes is coupled to a different portion of an electrical circuit; and
- an ablative plasma gun positioned with respect to the plurality of main electrodes, wherein the ablative plasma gun comprises a cup formed from an ablative material, the cup comprising:
  - a first portion having a first diameter; and
  - a second portion having a second diameter that is larger than the first diameter, and wherein a chamber is defined within the cup by the first portion and the second portion.

10. An arc flash elimination system in accordance with claim 9, wherein the plurality of main electrodes are spaced apart such that an area between the plurality of main electrodes defines a main gap, and wherein the ablative plasma gun is configured to inject an ablative plasma into the main gap to trigger an arc between the plurality of main electrodes.

11. An arc flash elimination system in accordance with claim 9, wherein the ablative plasma gun further comprises a first gun electrode comprising a first end, and a second gun electrode comprising a second end, wherein the first end and the second end extend in opposite directions from a central axis of the chamber.

12. An arc flash elimination system in accordance with claim 11, wherein the first end of the first gun electrode and the second end of the second gun electrode enter the chamber on radially opposite sides of the chamber.

13. An arc flash elimination system in accordance with claim 9, further comprising a trigger circuit configured to transmit an electrical pulse to activate the ablative plasma gun.

14. An arc flash elimination system in accordance with claim 9, wherein the cup includes an open end, the ablative plasma gun further comprises a cover that is sized to enclose the cup, wherein the cover comprises a nozzle.

15. An arc flash elimination system in accordance with claim 14, wherein the ablative plasma gun further comprises a base, and wherein the cover is mounted on the base such that the cup is positioned between the base and the cover.

16. An arc flash elimination system in accordance with claim 9, wherein the ablative plasma gun is formed from an ablative material.

17. A method of assembling an arc flash elimination system, the method comprising:

coupling each of a plurality of main electrodes to a different portion of an electrical circuit; and positioning an ablative plasma gun with respect to the plurality of main electrodes, wherein the ablative plasma gun includes a cup formed from an ablative material, the cup including a first portion having a first diameter and a second portion positioned above the first portion and having a second diameter that is larger than the first diameter, and wherein a chamber is defined within the cup by the first portion and the second portion.

18. A method in accordance with claim 17, wherein the ablative plasma gun includes a first gun electrode having a first end and a second gun electrode having a second end, the method further comprising inserting the first gun electrode and the second gun electrode into the chamber such that the first end and the second extend in radially opposite directions from a central axis of the chamber.

19. A method in accordance with claim 17, wherein the cup includes an open end, said method further comprising forming a nozzle in a cover that is sized to enclose the cup.

20. A method in accordance with claim 19, further comprising mounting the cover on a base of the ablative plasma gun and positioning the cup between the base and the cover.

* * * * *

UNITED STATES PATENT AND TRADEMARK OFFICE

CERTIFICATE OF CORRECTION

PATENT NO. : 8,330,069 B2
APPLICATION NO. : 12/883329
DATED : December 11, 2012
INVENTOR(S) : Cutler et al.

It is certified that error appears in the above-identified patent and that said Letters Patent is hereby corrected as shown below:

On the Title Page, in Item (54), in Title, in Column 1, Line 2, and in the specification, Column 1, Line 2, delete “ELMINATION” and insert -- ELIMINATION --, therefor.

Signed and Sealed this
Seventh Day of May, 2013

Teresa Stanek Rea
*Acting Director of the United States Patent and Trademark Office*